United States Patent [19]

Chen

[11] Patent Number: 4,768,700

[45] Date of Patent: Sep. 6, 1988

[54] DIFFUSION BONDING METHOD

[75] Inventor: Yu-Lin Chen, Indianapolis, Ind.

[73] Assignee: General Motors Corporation, Detroit, Mich.

[21] Appl. No.: 86,940

[22] Filed: Aug. 17, 1987

[51] Int. Cl.$^4$ .................... B23K 20/00; B23K 20/14; B23K 29/00

[52] U.S. Cl. .................... 228/159; 228/193; 228/219; 228/243; 29/156.8 H; 29/421.1; 416/97 A

[58] Field of Search .............. 228/127, 159, 174, 193, 228/199, 219, 243; 29/156.8 H, 156.8 B, 156.8 R, 156.8 P, 421 R; 416/97 A, 96 A, 90 R

[56] References Cited

U.S. PATENT DOCUMENTS

| | | | |
|---|---|---|---|
| 3,606,573 | 9/1971 | Emmerson et al. | 416/90 |
| 3,623,204 | 11/1971 | Wagle | 29/156.8 |
| 3,700,418 | 10/1972 | Mayeda | 29/180 |
| 4,042,162 | 8/1977 | Meginnis et al. | 228/106 |
| 4,383,854 | 5/1983 | Dembowski et al. | 419/1 |

Primary Examiner—Nicholas P. Godici
Assistant Examiner—Samuel M. Heinrich
Attorney, Agent, or Firm—Saul Schwartz

[57] ABSTRACT

A turbine blade spar wall surrounds a coolant plenum of the blade and is cast with an intermediate thickness exceeding its final or design thickness. The outer surface of the spar wall is machined to form a plurality of incomplete holes extending to bottoms located at the final thickness dimension of the spar wall. A pre-formed sheath of porous metal is fit closely around the spar wall outer surface with coolant pores in the sheath communicating with the incomplete holes. A high pressure inert gas is introduced into the coolant plenum concurrently with application of compressive forces to the sheath as both the sheath and the spar wall are raised to a high temperature whereby the sheath is diffusion bonded to the spar wall. The inert gas pressure in the coolant plenum reinforces the spar wall against the compressive forces. The inner surface of the spar wall is then chemically machined to an etch depth dimension which brings the spar wall to its design thickness and simultaneously removes the bottoms of the incomplete holes so that the incomplete holes become complete holes between the coolant plenum and the sheath of porous metal.

3 Claims, 2 Drawing Sheets

DIFFUSION BONDING METHOD

BACKGROUND OF THE INVENTION

1. Field of the Invention

This invention relates generally to turbomachine vanes and blades and, more particularly, to a method for fabricating transpiration cooled vanes and blades.

2. Description of the Prior Art

U.S. Pat. No. 3,606,573 issued to Emmerson et al on Sept. 20, 1971 and assigned to the assignee of this invention, describes a porous metal panel. U.S. Pat. No. 4,042,162 issued to Meginnis et al on Aug. 16, 1977 and assigned to the assignee of this invention, describes a method of fabricating a transpiration cooled turbine blade for a gas turbine engine. The blade has a hollow, airfoil-shaped spar which forms the structural part or backbone of the blade and a sheath of porous metal around the spar which forms the outer surface of the blade exposed to radiant heat and/or hot gas products of combustion. As described in the aforesaid U.S. Pat. No. 4,042,162, the sheath of porous metal is fabricated separately and diffusion bonded to the spar with pores in an inner surface of the sheath aligned with passages through the spar wall. The spar wall passages conduct gaseous coolant from a plenum chamber behind the spar wall to the pores. In diffusion bonding the sheath to the spar, referred to herein as hot isostatic press bonding or HIP bonding, very high pressure is applied to the outer surface of the sheath as the latter and the spar are heated to high temperatures. A major concern is preventing collapse or distortion of the spar during HIP bonding.

U.S. Pat. No. 3,623,204 issued to Wagle on Nov. 30, 1971 and assigned to the assignee of this invention, describes a method of fabricating a hollow turbine blade wherein sealed gas containers are disposed within the interior of the blade and then pressurized to force the outside surface of the blade against the inside of a die chamber. The spar is reinforced against the gas pressure forces by the surface of the die chamber. In the aforesaid U.S. Pat. No. 4,042,162, the passages in the spar wall are formed before the sheath is attached so that reinforcement of the spar wall during HIP bonding from within the blade requires a casting core or like arrangement. A method according to this invention of fabricating a transpiration cooled turbine blade or vane or other flow directing element incorporates improved and simplified steps for achieving spar wall reinforcement during HIP bonding.

SUMMARY OF THE INVENTION

This invention is a new and improved method of fabricating a transpiration cooled, fluid flow-directing element of a gas turbine engine such as a turbine blade or turbine vane. In the method according to this invention, an airfoil-shaped wall of a blade or vane spar has an initial wall thickness which exceeds its final or design wall thickness by a predetermined dimension denominated herein as the etch depth dimension. A plurality of incomplete holes are drilled in the spar wall and extend inward from an outer surface of the wall toward a coolant plenum behind the wall to a depth equal to the final or design thickness of the wall. A sheath of porous metal, pre-formed to the general airfoil shape of the spar wall, is disposed around the wall with the pores in the inside surface of the sheath aligned with respective ones of the incomplete holes. Concurrently with exposure of the sheath and spar to the high pressure and high temperature characteristic of HIP bonding, a medium such as an inert gas is introduced into the coolant plenum under high pressure. Since, at this stage in the process, the incomplete holes do not extend through the spar wall, the inert gas is captured in the coolant plenum and exerts a uniform outward pressure on the spar wall which reinforces the same against the opposite HIP bonding forces. When HIP bonding is completed, the spar wall is milled from within the coolant plenum by chemical or electrochemical machining techniques to the etch depth dimension, thereby bringing the spar wall to its final or design wall thickness and completing or opening each of the incomplete holes to the coolant plenum.

DESCRIPTION OF THE PREFERRED EMBODIMENT

Figure 1:
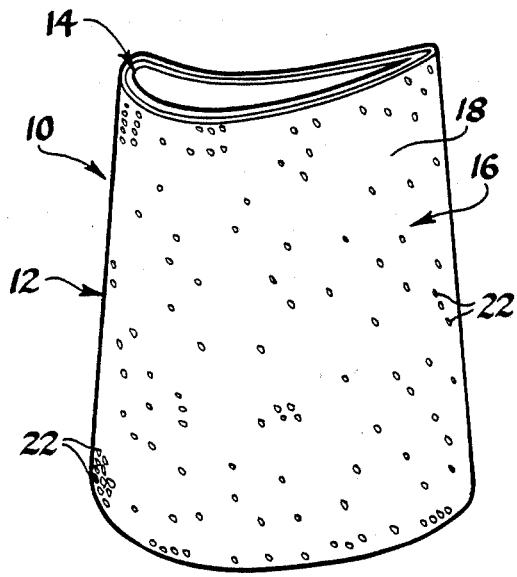
FIG. 1 is a perspective view of the airfoil portion of a transpiration cooled turbine blade or turbine vane fabricated in accordance with the method of this invention.
Figure 2:
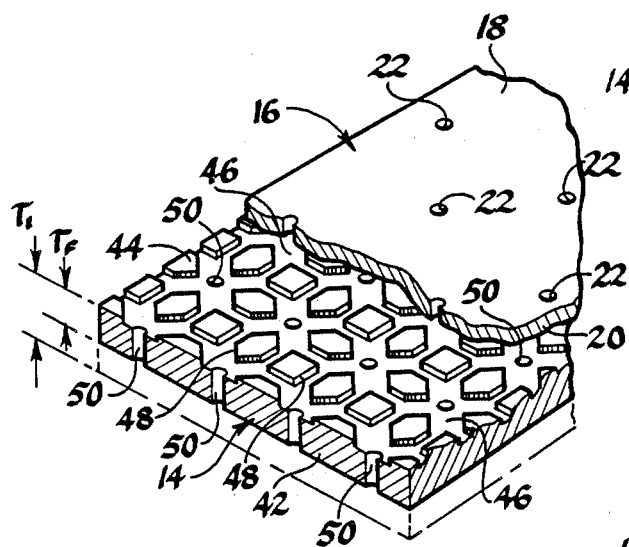
FIG. 2 is an enlarged, partially broken away perspective view of a portion of the wall of the turbine blade or turbine vanes shown in FIG. 1.

Referring now to FIGS. 1 and 2 of the drawings, a turbine blade 10 has a transpiration cooled, airfoil shaped flow directing portion 12. The blade 10 is representative of other flow directing elements in gas turbine engines such as turbine vanes and nozzle vanes. Generally, the flow directing portion 12 includes an airfoil-shaped spar wall 14 which forms the load carrying structure or backbone of the blade and a sheath 16 of porous metal. The sheath 16 has an outer surface 18, an inner surface 20, and a plurality of pores 22 which extend through the sheath and open through both the inner and the outer surfaces 20 and 18. Of course, the sheath may include multiple laminae such as described in the aforesaid U.S. Pat. No. 3,606,573. In the presence of a pressure gradient from the inner surface 20 to the outer surface 18, gaseous coolant will flow through the pores 22 toward the outer surface.

The spar wall 14 surrounds a coolant plenum 40 within the blade 10 and includes an inner surface 42 facing the coolant plenum and an outer surface 44 facing the sheath 16. The spar wall 14 has a final or design thickness $T_F$, FIG. 2, from the inner surface 42 to the outer surface 44, calculated to provide the required load carrying capability with a minimum rotating mass. The outer surface 44 of the spar wall has a plurality of coolant channels 46 or passages therein facing the inner surface 20 of the sheath. The channels 46 are interrupted by an array of pedestals 48 integral with the spar wall which terminate at the outer surface 44 of the spar wall. A plurality of holes 50 through the spar wall 14 extend from the inner surface 42 of the spar wall to the channels 46 between the pedestals 48. The sheath 16 is attached to the outer surface of the spar wall 14 through a plurality of diffusion bonds between the inner surface 20 of the sheath and respective ones of the pedestals 48.

The turbine blade 10 is cooled during engine operation as follows. Compressed air from the compressor of the engine is directed to the coolant plenum 40. The air pressure in the coolant plenum exceeds the gas pressure in the hot gas flow path around the turbine blade so that cooling air migrates radially outward through the spar wall 14 and the sheath 16. As the cooling air migrates from the coolant plenum to the hot gas flow path, heat is absorbed from the blade and carried away with the hot gases.

Figure 3A:
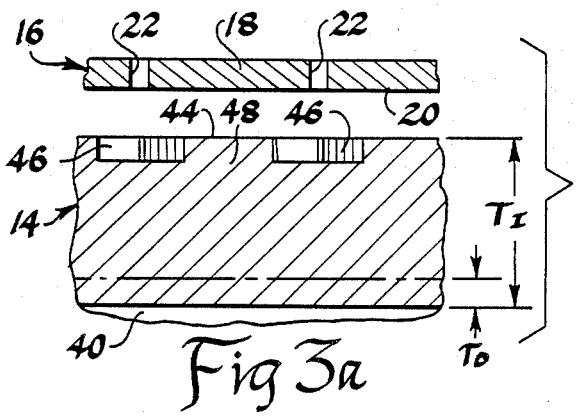
FIGS. 3a–3d are a series of views of the wall section shown in FIG. 2 illustrating the steps in the method of this invention.
Figure 3B:
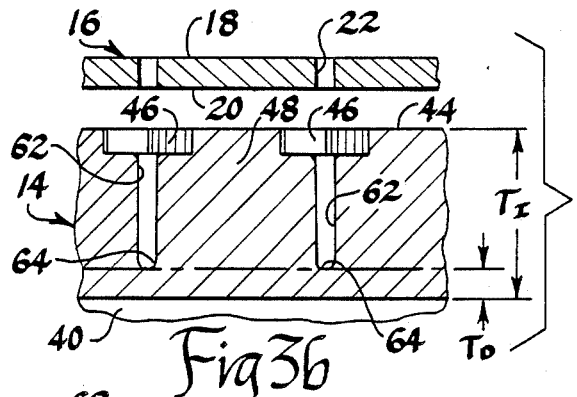
Figure 3C:
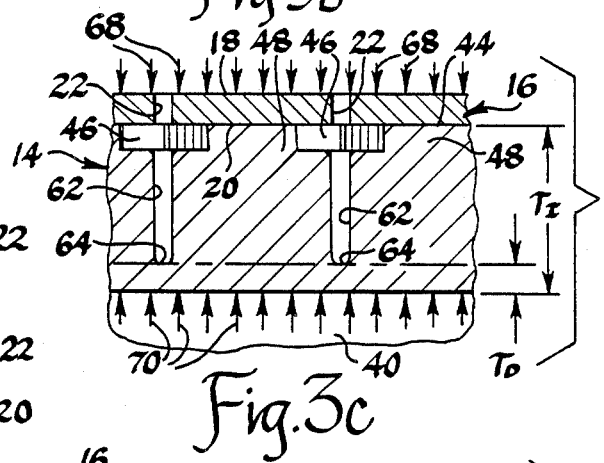
Figure 3D:
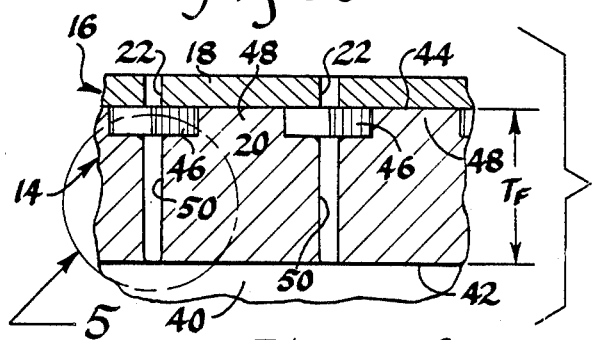
Figure 4:
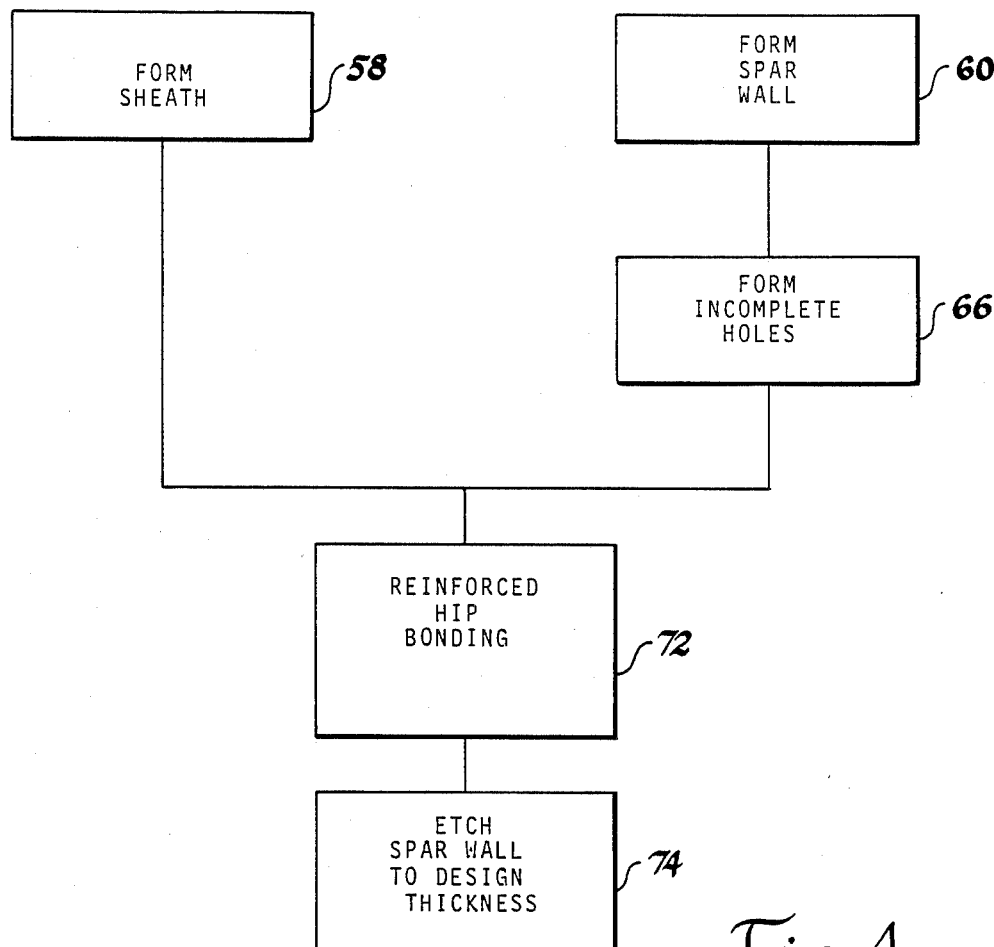
FIG. 4 is a block diagram representation of the steps in the method of this invention.
Figure 5:
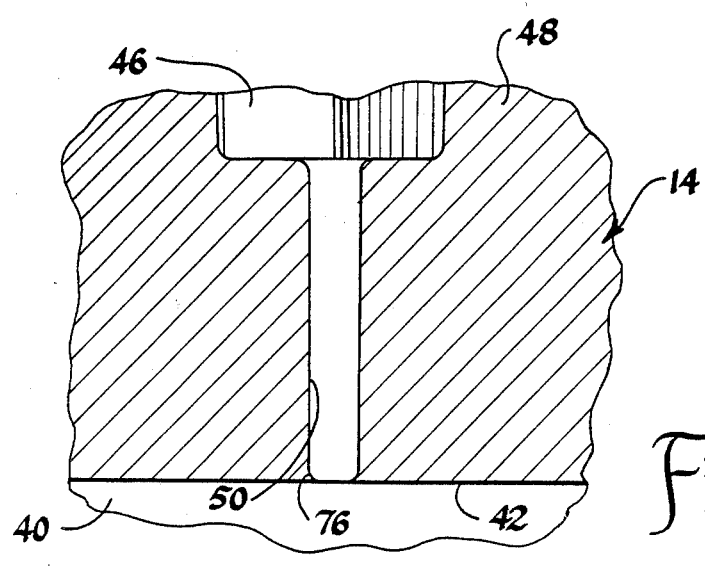
FIG. 5 is an enlarged view of the portion of FIG. 3d enclosed within the circle identified by the reference character 5 in FIG. 3d.

Referring, now, to FIGS. 3, 4 and 5, the method according to this invention of fabricating the turbine blade 10 is described as follows. In the first instance, the sheath 16 is pre-formed generally to the airfoil shape of the spar wall 14. Likewise, the spar wall 14 is pre-formed by casting or casting/electrochemical machining techniques to a configuration, FIG. 3a, wherein the channels 46 and the pedestals 48 are fully defined. The spar wall 14 has a pre-form or intermediate wall thickness $T_I$, FIGS. 3a–3c, which exceeds the design thickness $T_F$, FIGS. 2 and 3d, by an etch depth dimension $T_D$, FIGS. 3a–3c. The intermediate wall thickness $T_I$ is illustrated in phantom line in FIG. 2. The steps of pre-forming the sheath 16 to the general airfoil shape of the spar wall and of pre-forming the spar wall 14 are generally conventional and are represented by the boxes 58 and 60, respectively, in the schematic process diagram, FIG. 4.

In the next step of the fabrication method according to this invention, the spar wall 14 undergoes an electro-chemical drilling, laser drilling, or electric discharge machining operation whereby a plurality of incomplete holes 62, FIGS. 3b–3c, are formed in the bottoms of some of the channels 46. The incomplete holes 62 are machined to a depth relative to the outer surface 44 of the spar wall which locates a bottom 64, FIG. 3b, of each incomplete hole at a depth equal to the design thickness $T_F$ of the spar wall. The step of forming the incomplete holes 62 is represented by the box 66 in the schematic process diagram, FIG. 4.

In the next step in the fabrication method according to this invention, the pre-formed metal sheath 16 is disposed over the spar wall 14 with the inner surface 20 of the sheath facing the outer surface 44 of the spar wall. The pedestals 48 are located between the pores 22. The sheath and spar wall are then disposed in a fixture, as for example the fixture described in the aforesaid U.S. Pat. No. 4,042,162, capable of applying high compressive pressure on the outer surface 18 of the sheath. The coolant plenum 40 is sealed except for an inlet, not shown, connected to a source of a pressure medium, such as a source of high pressure inert gas.

To diffusion bond the sheath to the spar wall, the two are heated to a uniformly high diffusion bonding temperature of on the order of 2000°.F. while uniform compressive pressure forces represented by the arrows 68, FIG. 3c, are exerted on the outer surface 18 of the sheath 16. The pressure forces 68 press the inner surface 20 of the sheath against the outer surface 44 of the spar wall at the pedestals 48 so that, in the presence of high temperature, a bond at the atomic level develops between the sheath and the spar wall. Concurrently, the inert gas pressure medium is introduced into the coolant plenum 40 at high pressure so that uniformly distributed outwardly directed pressure forces represented by the arrows 70, FIG. 3c, react against the imperforate inner surface of the spar wall. The pressure forces 70 reinforce the spar wall against the compressive forces 68 so that, during HIP bonding, neither the spar wall or the sheath are collapsed or distorted. At the conclusion of HIP bonding, the pressure forces 68 on the outer surface 18 are relieved and the pressure medium is evacuated from the coolant plenum 40 to relieve the pressure forces 70. The reinforced HIP bonding step just described is represented by the box 72 in the schematic process diagram, FIG. 4.

In the next step in the fabrication method according to this invention, the spar wall 14 is chemically machined from within the coolant plenum to decrease the thickness of the spar wall from the intermediate thickness $T_I$ to the design thickness $T_F$. For example, an appropriate chemical etchant may be introduced into the coolant plenum 40 in a strength and for a time duration sufficient to remove material from the imperforate inner surface of the spar wall to a depth equal to the etch depth dimension $T_D$. When that amount of material is removed, the bottoms 64 of the incomplete holes 62 are also removed so that the incomplete holes 62 become the complete holes 50. The chemical removal of material from the spar wall to the etch depth dimension $T_D$ is represented by the box 74 in the schematic process diagram, FIG. 4.

Alternatively, the final step in the fabrication method according to this invention may be an electro-chemical or a chemical/electro-chemical etch. In electro-chemical etching, the coolant plenum 40 is filled with an electrolyte and an electrode, not shown, is disposed in the middle of the coolant plenum. Current at a first current density is then passed between the center electrode and the spar wall during which current passage material is removed from the spar wall to a dpeth corresponding to the etch depth dimension $T_D$. As best seen in FIG. 5, as material removal approaches the etch depth dimension, current is concentrated generally at an annular remnant 76 of the bottom 64 of each of the incomplete holes 62. The current density between the spar wall and the center electrode is then reduced to effect gradual elimination of the remnants 76 without enlarging the incomplete holes 62 where they intersect the inner surface 42 of the spar wall.

The embodiments of the invention in which an exclusive property or privilege is claimed are defined as follows:

1. A method of diffusion bonding a sheath of porous metal to a pre-formed airfoil shaped spar wall,
   said spar wall having a final wall thickness dimension and including an outer surface having a plurality of coolant channels therein interrupted by a plurality of integral pedestals teminating at said spar wall inner surface and an inner surface facing a coolant plenum adjacent said spar wall,
   said sheath of porous metal being pre-formed to fit closely around said spar wall outer surface and having a plurality of coolant passages therethrough, said method comprising the steps of:
   forming said spar wall to a first wall thickness dimension which exceeds said final wall thickness dimension of said spar wall by a predetermined etch depth dimension,
   forming in said spar wall a plurality of incomplete holes extending toward said spar wall inner surface from a plurality of said coolant channels to a corresponding plurality of bottoms each at a depth relative to said spar wall outer surface generally equal to said final wall thickness dimension, locating said sheath of porous metal around said spar wall outer surface with each of said pores in said sheath communicating with one of said coolant channels, introducing a pressure medium into said coolant plenum to apply to said spar wall inner surface from within said coolant plenum uniform outwardly directed pressure forces, pressing said sheath of porous metal against said spar wall outer surface with sufficient pressure and while being heated to a sufficient temperature to achieve a diffusion bond at each of said pedestals between said sheath of porous metal and said spar wall, the reinforcement provided by said outwardly directed pressure forces on said spar wall inner surface preventing distortion of said spar wall under the forces pressing said sheath of porous metal against said spar wall outer surface, and machining said spar wall inner surface from within said coolant plenum by one of a chemical etch technique and a chemical/electro-chemical etch technique to a depth equal to said etch depth dimension whereby each of said bottoms of said incomplete holes is removed so that each of said incomplete holes become a complete hole between said coolant plenum and said sheath of porous metal.

2. The method of diffusion bonding a sheath of porous metal to a pre-formed airfoil shaped spar wall recited in claim 1 wherein:

the step of introducing a pressure medium into said colant plenum to apply to said spar wall inner surface from within said coolant plenum uniform outwardly directed pressure forces includes introducing into said coolant plenum an inert gas under high pressure.

3. A method of diffusion bonding a sheath of porous metal to a pre-formed airfoil shaped spar wall, said spar wall having a final wall thickness dimension and including an outer surface having a plurality of coolant channels therein interrupted by a plurality of integral pedestals terminating at said spar wall inner surface and an inner surface facing a coolant plenum adjacent said spar wall, said sheath of porous metal being pre-formed to fit closely around said spar wall outer surface and having a plurality of coolant passages therethrough, said method comprising the steps of:

forming said spar wall to a first wall thickness dimension which exceeds said final wall thickness dimension of said spar wall by a predetermined etch depth dimension, forming in said spar wall a plurality of incomplete holes extending toward said spar wall inner surface from a plurality of said coolant channels to a corresponding plurality of bottoms each at a depth relative to said spar wall outer surface generally equal to said final wall thickness dimension, locating said sheath of porous metal around said spar wall outer surface with each of said pores in said sheath communicating with one of said coolant channels, introducing a pressure medium into said coolant plenum to apply to said spar wall inner surface from within said coolant plenum uniform outwardly directed pressure forces, pressing said sheath of porous metal against said spar wall outer surface with sufficient pressure and while being heated to a sufficient temperature to achieve a diffusion bond at each of said pedestals between said sheath of porous metal and said spar wall, the reinforcement provided by said outwardly directed pressure forces on said spar wall inner surface preventing distortion of said spar wall under the forces pressing said sheath of porous metal against said spar wall outer surface, and milling said spar wall inner surface from within said coolant plenum by a first electro-chemical etch wherein a current at a first current density is passed between an electrode in said coolant plenum and said spar wall inner surface in the presence of an electrolyte in said coolant plenum until said spar wall inner surface is etched to substantially said etch depth dimension but with each of said bottoms of said incomplete holes being removed to where an annular remnant remains around said incomplete hole, and final-milling said spar wall inner surface from within said coolant plenum by a second electro-chemical etch wherein a current at a second current density less than said first current density is passed between said electrode and said spar wall inner surface in the presence of said .electrolyte until said each of said annular remnants is completely removed so that each of said incomplete holes becomes a complete hole between said coolant plenum and said sheath of porous metal.

* * * * *